United States Patent
Schumacher et al.

(10) Patent No.: US 10,411,645 B1
(45) Date of Patent: Sep. 10, 2019

(54) PHOTOVOLTAIC MODULE SOURCED CONTROL POWER

(71) Applicant: SolarBOS, Inc., Livermore, CA (US)

(72) Inventors: Coel Schumacher, Auburn, CA (US); Jason Schripsema, Livermore, CA (US)

(73) Assignee: SOLARBOS, INC, Livermore, CA (US)

( * ) Notice: Subject to any disclaimer, the term of this patent is extended or adjusted under 35 U.S.C. 154(b) by 0 days.

(21) Appl. No.: 15/473,243

(22) Filed: Mar. 29, 2017

Related U.S. Application Data

(60) Provisional application No. 62/333,446, filed on May 9, 2016.

(51) Int. Cl.
- *H02S 40/36* (2014.01)
- *H02J 3/38* (2006.01)
- *H02J 3/46* (2006.01)
- *H02S 40/34* (2014.01)

(52) U.S. Cl.
CPC .............. *H02S 40/36* (2014.12); *H02J 3/383* (2013.01); *H02J 3/46* (2013.01); *H02S 40/34* (2014.12)

(58) Field of Classification Search
CPC .................................... H02J 3/383; H02J 3/46
See application file for complete search history.

(56) References Cited

U.S. PATENT DOCUMENTS

| | | | |
|---|---|---|---|
| 3,350,234 A | 10/1967 | Ule | |
| 4,964,713 A | 10/1990 | Goetzberger | |
| 5,498,297 A | 3/1996 | Oneill | |
| 5,527,191 A * | 6/1996 | Bevis | H01R 4/38 439/287 |
| 6,215,636 B1 | 4/2001 | Hellemans | |
| 6,376,774 B1 * | 4/2002 | Oh | H01H 85/10 174/92 |
| 6,472,878 B1 | 10/2002 | Bruchmann | |
| 6,545,211 B1 | 4/2003 | Mimura | |
| 6,738,246 B1 | 5/2004 | Strumpler | |
| 6,966,184 B2 | 11/2005 | Toyomura | |
| 7,057,311 B1 | 6/2006 | Zhou | |
| 8,502,416 B2 * | 8/2013 | Falk | H02J 3/383 307/77 |
| 8,558,709 B2 | 10/2013 | Schripsema | |
| 2001/0023703 A1 | 9/2001 | Kondo | |
| 2002/0038667 A1 | 4/2002 | Kondo | |
| 2003/0075211 A1 | 4/2003 | Makita | |
| 2004/0174664 A1 | 9/2004 | Werner | |
| 2009/0168277 A1 | 7/2009 | Changali | |

(Continued)

FOREIGN PATENT DOCUMENTS

| | | |
|---|---|---|
| EP | 2742589 | 6/2014 |
| EP | 2499710 | 7/2014 |

(Continued)

OTHER PUBLICATIONS

"HomeRun Disconnecting Combiner Boxes" web page, published before Jul. 13, 2010, 1 page.

(Continued)

*Primary Examiner* — Daniel Kessie

(74) *Attorney, Agent, or Firm* — Niels Haun; Dann, Dorfman, Herrell & Skillman

(57) ABSTRACT

Power control using photovoltaic module sourced power.

6 Claims, 3 Drawing Sheets

(56) References Cited

U.S. PATENT DOCUMENTS

| | | |
|---|---|---|
| 2009/0207543 A1 | 8/2009 | Boniface |
| 2011/0073150 A1 | 3/2011 | Hightower |
| 2011/0090607 A1 | 4/2011 | Luebke |
| 2011/0121984 A1 | 5/2011 | Schripsema |
| 2011/0273015 A1 | 11/2011 | Adest |
| 2013/0057997 A1 | 3/2013 | Dent |
| 2014/0226242 A1 | 8/2014 | Schripsema |
| 2015/0103454 A1 | 4/2015 | Schripsema |
| 2015/0194801 A1 | 7/2015 | Schripsema |

FOREIGN PATENT DOCUMENTS

| | | |
|---|---|---|
| EP | 2870669 | 5/2015 |
| JP | H09113561 | 5/1997 |
| JP | 2001320827 | 11/2001 |
| JP | 2011101537 A | 5/2011 |
| KR | 100996627 | 11/2010 |
| KR | 100999978 | 12/2010 |
| RU | 100282 | 12/2010 |
| WO | 2008125915 | 10/2008 |
| WO | 2011057255 | 5/2011 |
| WO | 2013049501 | 4/2013 |
| WO | 2014011593 | 1/2014 |

OTHER PUBLICATIONS

FHS 40-P/SP600 Minisens, http://www.lem.com/docs/products/fhs%2040-p%20sp600.pdf, publsihed before Nov. 9, 2010, 18 pages.

International Search Report dated Jul. 29, 2011 for corresponding International Application No. PCT/US2010/056006.

International Search Report dated Mar. 11, 2013 for International Application No. PCT/US2012/057816.

International Search Report dated Oct. 18, 2013 in corresponding International Application No. PCT/US2013/049658.

Written Opinion dated Oct. 18, 2013 in corresponding International Application No. PCT/US2013/049658.

\* cited by examiner

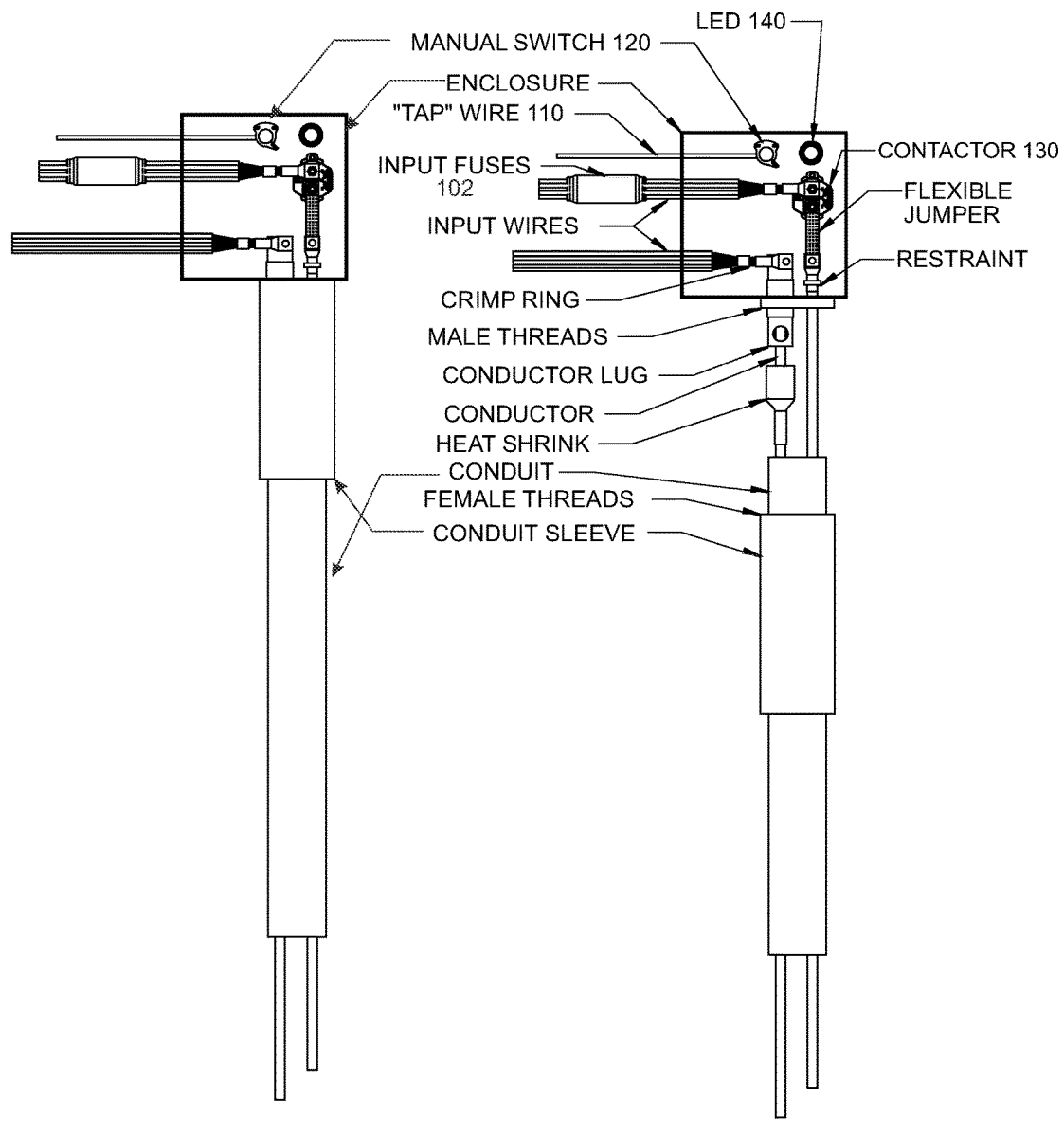

PHOTOVOLTAIC MODULE SOURCED CONTROL POWER

RELATED APPLICATIONS

This application claims the benefit of priority of U.S. Provisional Application No. 62/333,446, filed on May 9, 2016, the entire contents of which application(s) are incorporated herein by reference.

FIELD OF THE INVENTION

The present invention relates generally to power distribution and more particularly but not exclusively to power control using photovoltaic module sourced power.

BACKGROUND

Power distribution equipment requires a multitude of combining and distributing circuits and also requires passing multiple conductors into and out of such equipment. At the same time safety codes impose specific clearance distances for conductor bending room complicating the handling of multiple conductors. In addition, safety switches are required to de-energize equipment prior to service. An electrically controlled switch, such as a contactor, can provide disconnecting means in smaller more cost effective packages than manual disconnects; however, contactors require a source of control power, the addition of which increases the cost and complexity of systems in which they are used. Accordingly, it would be an advance in the art to provide systems which can efficiently support multiple conductors and/or utilize contactors without the need for an additional power source.

SUMMARY

In one of its aspects the present invention facilitates connecting multiple circuits to one connector to provide fewer connection points to increase reliability and decrease cost. In this regard present invention may provide a system and method to connect several circuits to one connection point. Typically this is difficult to achieve due to several conductors pulling out of a singular connection more readily than a single large conductor in a single connector. The present invention overcomes this shortcoming by physically capturing the multiple conductors so they behave as one. In another of its aspects, the present invention provides an apparatus, system and method to relocate conductor output connection point(s) to the exterior of the equipment where bending room is readily available. The connection is both insulated and protected from the environment. In addition, a connection point can be made flexible to allow the connected circuits to move due to expansion and contraction.

In yet another of its aspects, the present invention provides a system and method to source control power from (a) photovoltaic module(s) within a series connected string of several photovoltaic modules, and to provide the sourced power to an electrically controlled switch, such as a contactor. Contactor status may be provided by an indicator light wired in series with an auxiliary contact in the contactor. The auxiliary contact may be of the normally closed type to provide fail safe operation. Powering a contactor directly from a photovoltaic module (or an array thereof) can reduce cost and improve convenience. However string voltages may be very high, so sourcing power from a single module within a series connected string of modules can overcome the need for additional voltage reducing circuitry. Circuitry may be used to manipulate voltage, however, voltage from one module requires significantly less manipulation than the significantly higher string voltage.

BRIEF DESCRIPTION OF THE DRAWINGS

The foregoing summary and the following detailed description of exemplary embodiments of the present invention may be further understood when read in conjunction with the appended drawings, in which:

FIGS. 2A, 2B schematically illustrate side elevational views of an exemplary configuration of a enclosure/conduit assembly with output and inputs in accordance with the present invention, in which FIG. 2B illustrates the conduit sleeve in an open position to reveal the conductors.

DETAILED DESCRIPTION OF THE INVENTION

Figure 1:
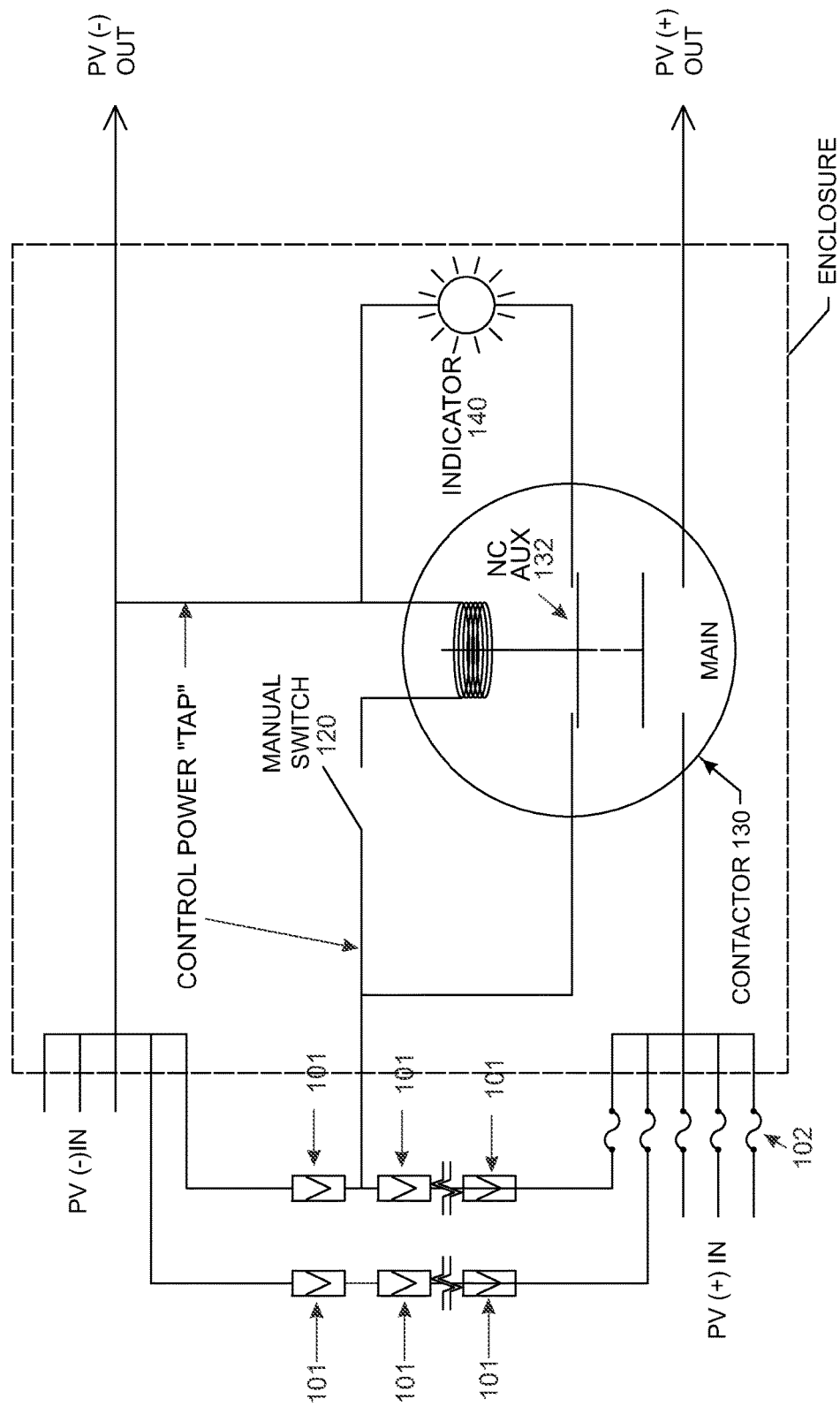
FIG. 1 illustrates an exemplary wiring schematic depicting photovoltaic module sourced control power.

Referring now to the figures, wherein like elements are numbered alike throughout, FIG. 1 depicts a contactor 130 having its control power sourced from one or more photovoltaic modules 101. To assist in protecting the circuit, a fuse 102 may be provided for each string of photovoltaic modules 101. A tap wire 110 electrically connects the output from one or more photovoltaic modules 101 to the contactor 130. A manually operated switch 120 may be provided between the tap wire 110 and the contactor 130 to allow an operator local control of the switch 120 to control the contactor 130. Sourcing the control power from a single module 101, rather than later in the string after several modules 101, may be helpful to provide a reduced voltage at the contactor 130. An indicator light 140 may be provided which may be controlled by a normally closed auxiliary contact 132 for fail safe operation. In such a situation, the indicator light 140 will be on when the contactor 130 is off and "safe". Upon operation of the manual switch 120 to close the switch 120, the contactor 130 operates to disconnect the indicator light 140 while allowing current to flow from the strings of modules 101 through the MAIN to provide continuity between PV(+) IN and PV(+) OUT (or current to flow from PV(+) IN to PV(+) OUT). Similarly a contactor can be used to control negative conductors as well as positive conductors.

Figure 3A:
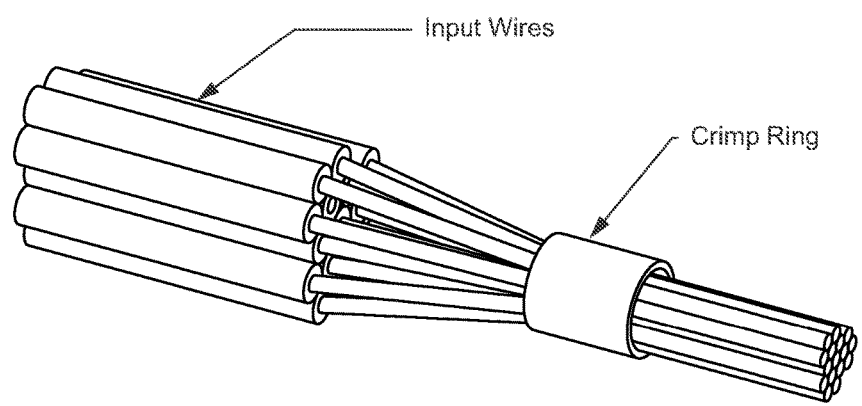
FIGS. 3A, 3B schematically illustrate perspective views of several inputs crimped together with a crimp ring so the multiple conductors behave as one, where FIG. 3B includes a compression lug.
Figure 3B:
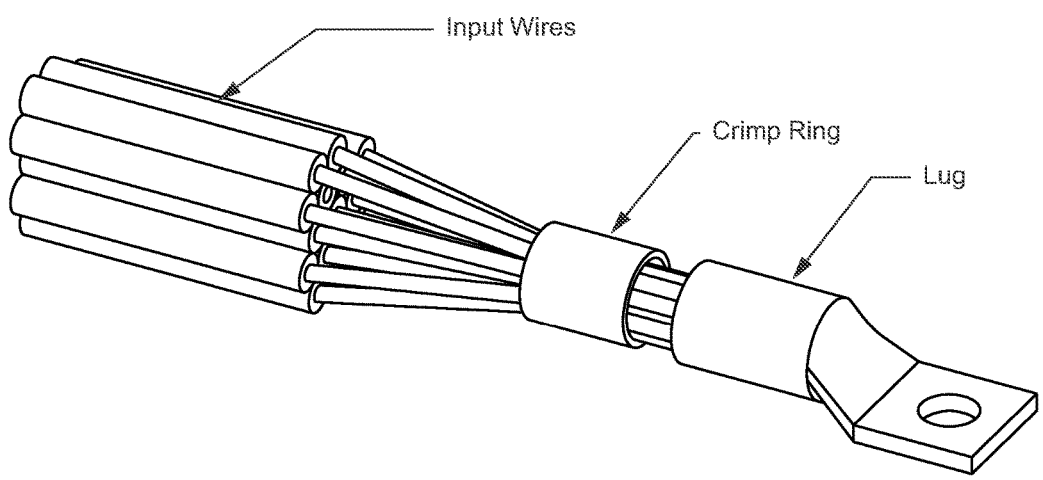

The circuit of FIG. 1 may be provided in a physical device, such as that exemplified in FIGS. 2A, 2B, showing the tap wire 110, manual switch 120, contactor 130, and indicator light 140. Specifically, a plurality of INPUT WIRES may be bundled together to deliver electricity from a plurality of strings of modules 101, where each INPUT WIRE is associated with an individual string. The plurality of INPUT WIRES may be captured in a CRIMP RING so the several INPUT WIRES act as a single wire after crimping, FIG. 3A. In addition, a LUG may be provided on the captured wires to provide for convenient mechanical and electrical connection thereto, FIG. 3B. The INPUT WIRES are thus physically configured to behave as a single conductor. The individual INPUT WIRES may be of equal length to ensure that all wires seat completely in the compression LUG. The LUG may be crimped to create an effective electrical connection. The capturing of the INPUT WIRES in this manner with the LUG can provide fewer connection points to increase reliability and decrease cost associated therewith.

Returning to FIGS. 2A, 2B, the INPUT WIRES with CRIMP RING and LUG may be connected via the LUG to a conductor disposed within the enclosure. Heat shrink or similar material may provide insulating and sealing between the enclosure and the connectors. Additional heat shrink or similar material may provide insulation and sealing between the connector and the conductors. Male threads may be provided on the enclosure allow a sleeve to slide up the conduit and mechanically fasten to the enclosure.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A photovoltaic module system having first and second electrical output terminals, comprising:
   at least one string of photovoltaic modules electrically connected in series, each string having opposing first and second ends between which the respective photovoltaic modules are disposed, the first end disposed in electrical communication with the first electrical output terminal of the photovoltaic module system and the second end disposed in electrical communication with the second electrical output terminal;
   a power tap wire electrically connected at a first end thereof at a midpoint between an adjacent pair of the modules of a selected one of the strings;
   a switch electrically connected to an opposing second end of the power tap wire at an input of the switch, the switch having an output end disposed in electrical communication with the input of the switch when the switch is closed and the output end electrically isolated from the input of the switch when the switch is open;
   a contactor having first and second actuator connections, the first actuator connection electrically connected to the output end of the switch and the second actuator connection electrically connected to the first end of the selected one of the strings, so that power operable to actuate the contactor is received by the contactor from the selected one of the strings by completing a circuit between the midpoint and the first end of the selected one of the strings when the switch is closed, the contactor operable to move between a first and a second position, the first position configured to electrically connect the second end of the selected one of the strings to the second electrical output terminal when the switch is closed, and the second position configured to electrically disconnect the second end of the selected one of the strings from the second electrical output terminal when the switch is open,
   whereby the switch and contactor cooperate to energize and de-energize the second output terminal of the photovoltaic module system.

2. The photovoltaic module system of claim 1, wherein the at least one string comprises a plurality of strings of photovoltaic modules, and wherein the output of each string comprises an elongated conductor, wherein the conductors are crimped together at a first location along the length of the conductors and wherein the conductors are crimped together at a second location along the length of the conductors with a ferrule having a tang for bolting the assembly to another conductive part, whereby a unitary connection point is created to provide a single point for electrical connection.

3. The photovoltaic module system of claim 2, comprising an overmolded fuse disposed on each of the conductors to provide a fused, crimped plurality of conductors.

4. The photovoltaic module system of claim 1, wherein the contactor is normally open in the first position.

5. The photovoltaic module system of claim 1, comprising an indicator light and wherein the second position of the contactor is configured to complete a circuit between the midpoint and the first electrical output terminal of the photovoltaic module system to energize the light.

6. The photovoltaic module system of claim 1, wherein the switch and contactor cooperate to energize the second output terminal of the photovoltaic module to provide the energy of all the at least one strings across the input and output terminals of the photovoltaic module and to de-energize the second output terminal of the photovoltaic module system to provide none of the energy of the at least one strings across the input and output terminals of the photovoltaic module.

* * * * *